UNITED STATES PATENT OFFICE.

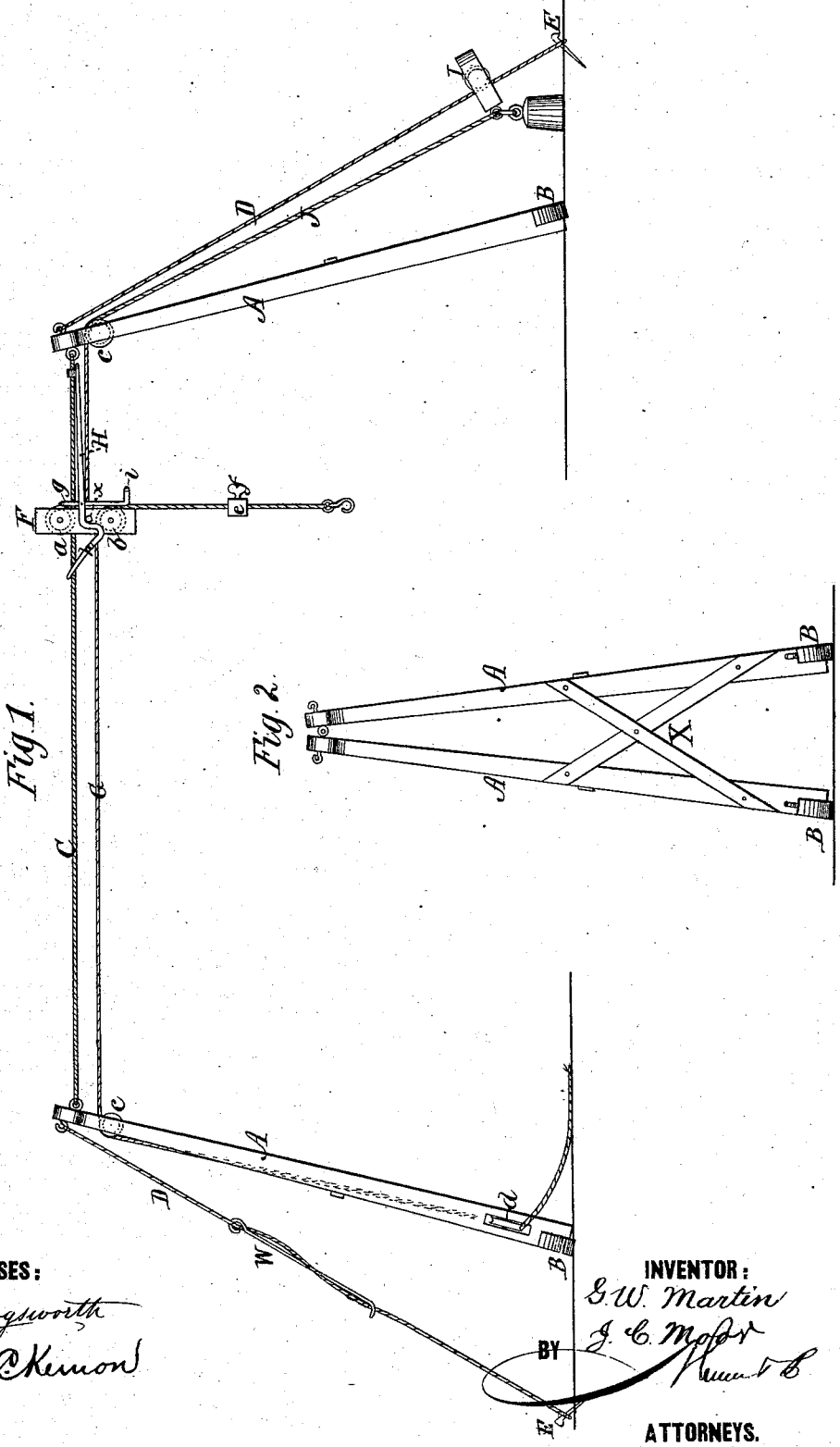

GEORGE W. MARTIN AND JAMES C. MOOR, OF BROOKSTON, INDIANA.

IMPROVEMENT IN HAY-ELEVATORS.

Specification forming part of Letters Patent No. 159,430, dated February 2, 1875; application filed December 7, 1874.

*To all whom it may concern:*

Be it known that we, GEORGE W. MARTIN and JAMES C. MOOR, of Brookston, in the county of White and State of Indiana, have invented a new and Improved Hay-Derrick; and we do hereby declare that the following is a full, clear, and exact description of the same, reference being had to the accompanying drawing forming a part of this specification, in which—

Figure 1 is a side elevation of the hay-derrick arranged for use. Fig. 2 shows a portion of the frames when connected by the cross-ties for transportation.

This invention relates to certain improvements in apparatus for loading, stacking, ricking, and stowing hay, straw, &c., upon a wagon or mow. It consists in two A-shaped frames connected at the top by a rope or wire cable, and held in a vertical position slightly inclined toward each other by means of guy-ropes attached to picket-pins firmly driven into the ground. Upon said cable is suspended a frame containing two sheaves, the upper one of which runs upon the wire cable. Around the lower one, and running parallel with the cable, is a rope which passes around two sheaves in one of the frames, and is attached to a single-tree or hitching attachment for a horse. To the other end of said rope is attached the hay-fork, and just above the hay-fork an adjustable stop, which, as the fork is elevated, strikes a catch which holds the movable frame and allows the fork to pass laterally to a position above the wagon or mow, the said frame being brought into position again and latched by a rope attached to a weighted pulley running upon one of the guy-ropes.

The apparatus, as thus described, is provided with detachable cross-ties, which, when the A-shaped frames are brought together, unite the same and adapt them to easy transportation.

In the drawing, A A represent the two supporting-frames having at the bottom the cross-pieces B, shaped like runners, for easy transportation. C is the cable, which is attached to the top of the frames A, and is drawn tight by means of the guy-ropes D, attached to picket-pins E, securely driven into the ground. F is the movable frame, having pins $x$ $x$ and containing the sheaves $a$ and $b$, of which $a$ runs upon the wire cable C. G is a rope, one end of which passes around sheaves $c$ and $d$ in the frame A, and is attached to a single-tree or other attachment for a horse, and the other end passes around sheave $b$ in the frame F, and is attached to the hay-fork, the said rope having just above the hay-fork an adjustable stop and unlatching device, consisting of the block $e$ and binding-screw $f$, which stops the vertical motion of the fork, and unlatches the frame, to allow it lateral motion at heights to suit the size of the load. H is the catch, which is attached at one end to the cable, is supported upon the same by the loop $g$, and is provided with the latching ends $h$ and an extension, $i$. I is a weighted pulley running upon the guy-rope D, and attached, by a rope, J, to the frame F, for restoring it to its first position and relatching it. X X are detachable cross-ties, which, when the frames A A are brought together, unite the same in one, as it were, and adapt the apparatus to be transported upon its runner-shaped base-frames. W is a rod, bent at its ends, as shown, which is twisted into the guy-rope, and then operated as a lever to tighten the cable.

The operation of our improved hay-derrick is as follows: The fork having been loaded with hay, a draft is exerted upon the rope G, which raises the said fork until stopped by the adjustable device $e$ $f$, which strikes against the extension $i$ of the catch and lifts the latching-hooks away from pins $x$ $x$. As soon as this takes place the draft upon rope G causes frame F to move laterally along the cable with the loaded fork until directly above the wagon, stack, rick, or mow. As soon as the hay is dumped the rope G is slackened, and the weighted pulley restores the frame F to its former position and relatches it.

In addition to the uses herein described for which our apparatus is intended, we propose, also, to so modify the same as to adapt it to raising water for railroad-tanks, hoisting building materials, and to such other use as it may be adapted.

Having thus described our invention, what we claim as new is—

1. The combination of the catch H with the wire-cable, and the frame F, having sheaves $a$ and $b$, and the pins $x$, substantially as and for the purpose described.

2. The combination, with the guy-rope D, of the weighted pulley I and rope J, attached to frame F, substantially as and for the purpose described.

GEORGE W. MARTIN.
JAMES C. MOOR.

Witnesses to both signatures:
WM. A. SMITH,
DAVID PLATT.